United States Patent [19]
Imani

[11] Patent Number: 5,255,935
[45] Date of Patent: Oct. 26, 1993

[54] AIR SUSPENSION SYSTEM
[75] Inventor: Yuichi Imani, Hamamatsu, Japan
[73] Assignee: Nippondenso Co., Ltd., Kariya, Japan
[21] Appl. No.: 997,120
[22] Filed: Dec. 24, 1992

Related U.S. Application Data
[63] Continuation of Ser. No. 665,798, Mar. 8, 1991, abandoned.

[30] Foreign Application Priority Data
Mar. 9, 1990 [JP] Japan ................... 2-58818

[51] Int. Cl.$^5$ ..................... B60G 15/12; B60G 11/30
[52] U.S. Cl. ..................................... 280/708; 280/711
[58] Field of Search ............. 280/711, 712, 713, 702, 280/707, 708; 137/625.46

[56] References Cited
FOREIGN PATENT DOCUMENTS

| | | |
|---|---|---|
| 3537212 | 4/1986 | Fed. Rep. of Germany ...... 280/707 |
| 58-122211 | 7/1983 | Japan . |
| 59-159440 | 9/1984 | Japan ................... 280/707 |
| 60-80920 | 5/1985 | Japan . |
| 61-135807 | 6/1986 | Japan ................... 280/707 |
| 3-262720 | 11/1991 | Japan ................... 280/708 |
| 936515 | 9/1963 | United Kingdom ........... 137/625.46 |

Primary Examiner—Karin L. Tyson
Attorney, Agent, or Firm—Cushman, Darby & Cushman

[57] ABSTRACT

An air suspension system includes a rotary valve 3 disposed to selectively establish and interrupt communication between an air spring 1 and a plurality of subchambers of an air chamber 2, and a motor 4 by which the rotary valve 3 is rotated. The rotary valve 3 is composed of a hollow outer cylindrical member 21 having openings opened to each subchamber of the air chamber 2, and an inner cylindrical member 22 having air holes. The openings of the outer cylindrical member 21 have different lengths in the direction of rotation of the inner cylindrical member 22. By this arrangement, the number of the subchambers of the air chamber 2, which may be communicated with the primary air chamber 1 through the openings and the air holes, is adjusted in response to angular position of the inner cylindrical member 22.

8 Claims, 9 Drawing Sheets

AIR SUSPENSION SYSTEM

This is a continuation of application No. 07/665,798, filed on Mar. 8, 1991, which was abandoned upon the filing here.

BACKGROUND OF THE INVENTION

1. Field of the Invention

The present invention relates to an air suspension system, particularly in which an air chamber has a variable volume so as to provide different spring constants.

2. Description of Prior Art

It is well known to include a variable volume air chamber in an air suspension system to provide different spring constants. In such an air suspension system, an air chamber serves as an air spring and is defined at the upper end of a piston rod which in turn, forms a shock absorber. Another air chamber is defined around the air chamber. A valve rod is driven for rotation by a motor so as to selectively communicate between the two air chambers to change the air spring constant (see, for example, Japanese laid-open patent publication No. 80920/85).

However, such a conventional air suspension system can provide only two different air spring constants. Riding comfort and maneuverability are far from satisfactory as such.

In order to improve the riding confort and maneuverability of a vehicle, it is desirable to finely control the spring constant of an air suspension system in response to travelling conditions of a vehicle.

When an air suspension system has a plurality of spring constants, it is desirable to reduce the size of the overall suspension by simplifying a mechanism to vary the spring constants. This facilitates mounting of the suspension to a vehicle.

It is also necessary to improve the response when the spring constants are changed. This is due to the fact that an optimum spring constant cannot be obtained in response to travelling conditions of a vehicle if the spring constants are not changed quickly. Riding comfort and maneuverability can not be improved as such.

SUMMARY OF THE INVENTION

Accordingly, it is an object of the present invention to provide an air suspension system which provides a plurality of spring constants.

Another object of the invention is to provide an air suspension system which provides an improved response when spring constants are changed.

A further object of the invention is to provide an air suspension system which can reduce the size of the suspension.

In order to achieve the foregoing objects, there is provided an air suspension system with a variable spring constant which comprises a primary air chamber disposed between a vehicle body and a vehicle wheel and serving as an air spring, a plurality of secondary air chambers communicable with the primary air chamber, a hollow outer cylindrical member extending through the plurality of secondary air chambers and including a plurality of openings opened to the plurality of secondary air chambers, an inner cylindrical member disposed within the outer cylindrical member and including a plurality of air holes corresponding to the openings, the inner cylindrical member being hollow and having an interior in communication with the primary air chamber, and rotating means for rotating one of the hollow inner and outer cylindrical members, at least either the plurality of openings or the plurality of air holes having different lengths in a direction of rotation, and a number of the secondary air chambers to communicate with the primary air chamber through the openings and air holes being adjustable by rotating one of the hollow inner and outer cylindrical members.

With this arrangement, the number of the secondary air chambers which may be communicated with the primary air chamber is adjusted by rotating either one of the hollow inner and outer cylindrical members. This provides a plurality of spring constants.

A single mechanism, composed of the hollow inner and outer cylindrical members, is used to provide a plurality of spring constants. This prevents complication of a mechanism to change the spring constants and can thus reduce the size of the overall suspension.

Further, either one of the hollow inner and outer cylindrical members can be rotated to continuously change the spring constants. Such a simple series of operations enable continuous change of the spring constants with high response.

DETAILED DESCRIPTION OF THE PREFERRED EMBODIMENTS

The present invention will now be described with reference to the drawings.

In the following examples, the present invention is applied to a strut-type suspension which can provide five different spring constants.

Figure 1:
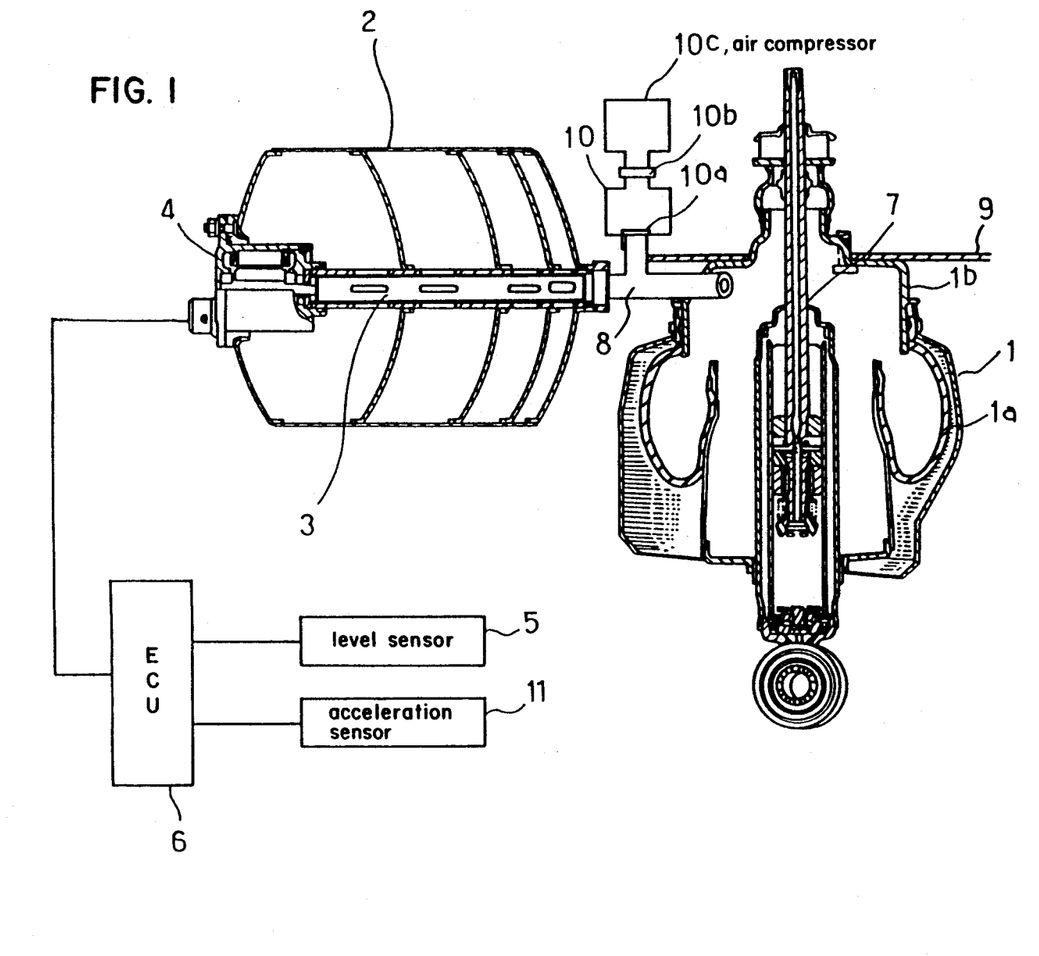
FIG. 1 is a view showing the structure of an air spring type suspension according to a first embodiment of the present invention.

FIG. 1 illustrates the structure of an air suspension system according to a first embodiment of the present invention. As illustrated, an air spring 1 extends between a vehicle body 9 and a wheel (not shown). The air spring 1 includes a rubber side wall 1a and a metal side wall 1b to improve the integrity of the seal.

A hose 8 extends through the metal wall 1b of the air spring 1 and has one end kept in communication with the interior of the air spring 1. The hose 8 is also in communication with an enclosure 2 (hereinafter referred to as an air chamber) and a surge tank 10. The surge tank 10, the air spring 1 and the air chamber 2 are thus mutually communicated with one another through the hose 8. When the air spring 1 is vibrated, an air valve 10a arranged within the surge tank 10 is closed so as to prevent the entry of air into the surge tank 10.

The surge tank 10 is connected through a levelling valve 10b to an air compressor 10c which in turn, provides a supply of compressed air. The levelling valve 10b includes an exhaust valve (not shown) through which the surge tank 10 is held in communication with the ambient atmosphere. The ground clearance of a vehicle can, therefore, be changed by adjusting the pressure of air confined within the surge tank 10 by means of the levelling valve 10b. Specifically, in order to increase the ground clearance of a vehicle, air under pressure is supplied from the air compressor 10c through the levelling valve 10b to the surge tank 10. The air valve 10a is then opened to introduce the compressed air to the air spring 1 and the air chamber 2. In order to decrease the ground clearance of a vehicle, the surge tank 10 is brought into communication with the ambient atmosphere through the levelling valve 10b so that the pressure in the surge tank 10 is brought to the pressure of each of the air spring 1 and the air chamber 2. Under the circumstances, the air valve 10a is opened so as to allow air to flow from the air spring 1 and the air chamber 2 into the surge tank 10 and then, out of the surge tank 10 through the levelling valve 10b.

Figure 8:
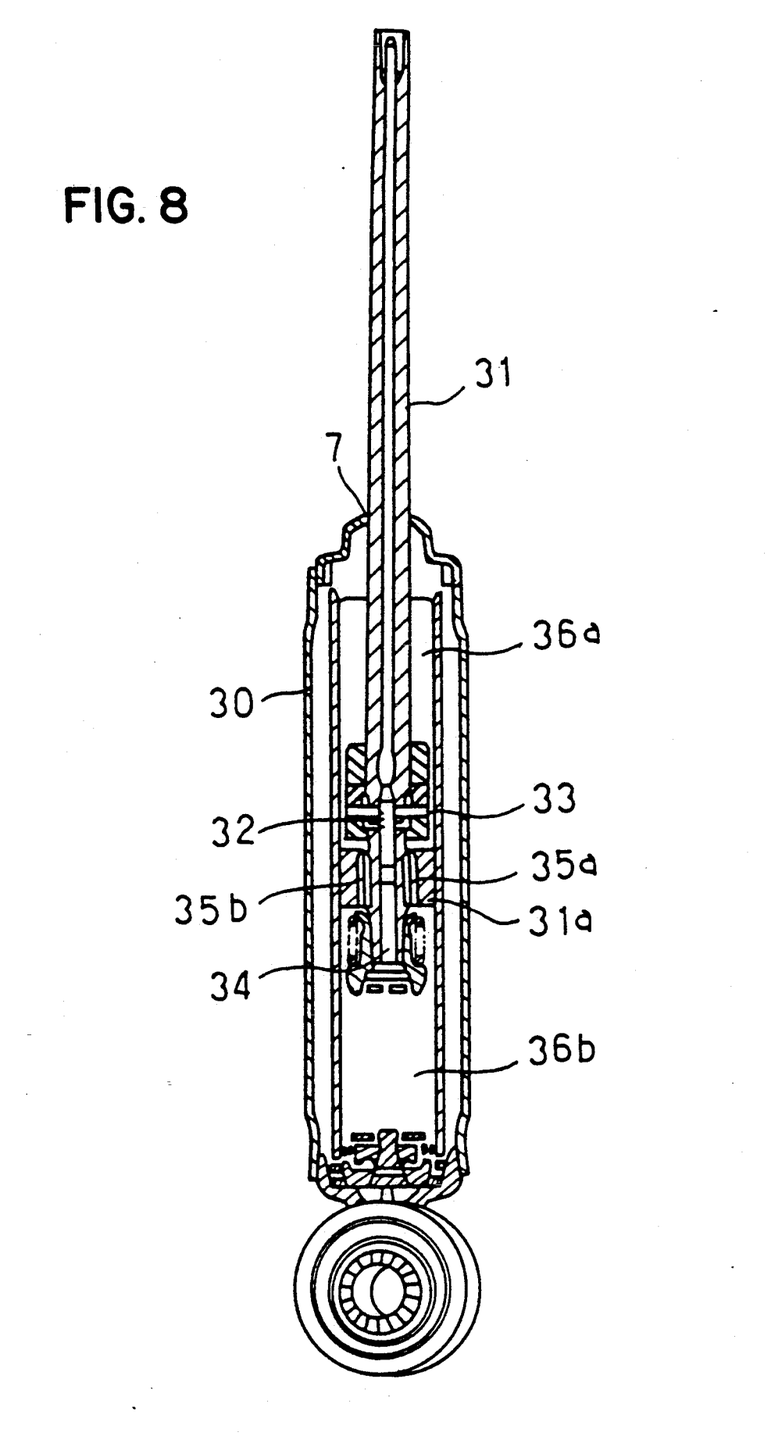
FIG. 8 is a sectional view of a shock absorber shown in FIG. 8.

A shock absorber 7 is disposed to dampen vibrations of the air spring 1 and is shown in section in FIG. 8.

FIG. 8 shows hydraulic oil filled in a cylinder 30 within which a piston 31a is slidably mounted in fluid-tight manner.

The piston 31a includes two passages 35a and 35b through which an upper chamber 36a and a lower chamber 36b of the cylinder 30 are normally held in communication with one another. Check valves (not shown) are disposed within the passages 35a and 35b so as to allow the hydraulic oil to flow in different directions only. The passages 35a and 35b have different cross sectional areas so that vibration of the air spring 1 may be damped.

A piston rod 31 is coupled to the piston 31a. An actuator (not shown) is mounted at the upper end of the piston rod 31 and connected to a control valve 32. The control valve 32 is operable to selectively communicate between two lines 33 and 34. The lines 33 and 34 extend into the upper and lower chambers 36a and 36b, respectively. When the control valve 32 is rotated by the actuator, the cross sectional area through which the upper and lower chambers of the cylinder are communicated with one another is varied. This results in a change in damping force of the shock absorber 7.

A level sensor 5 and an acceleration sensor 11 cooperate to detect vibration of the air spring 1.

The level sensor 5 is operable to detect a change in the ground clearance H of a vehicle or deviation from the neutral position when a vehicle is not vibrated and send a corresponding signal to an electronic control unit 6 (hereinafter simply referred to as ECU).

The acceleration sensor 11 is operable to detect vertical acceleration G of the upper portion of the air spring or the vehicle body 9 and send a corresponding signal to the ECU 6.

ECU 6 is operable to receive signals from the level sensor 5 and the acceleration sensor 11 so as to establish a desired spring constant in response to vibration of the air spring 1. ECU 6 then generates a drive signal indicative of the spring constant thus established and sends it to a motor 4 mounted within the air chamber 2. Damping force produced by the shock absorber 7 is also controlled by ECU 6, but such control is well known in the art and will not be described herein.

The structure of the air chamber 2, the motor 4 and a rotary valve 3 driven by the motor 4 will now be described with reference to FIG. 2.

As illustrated, the air chamber 2 is divided into four subchambers 20a, 20b, 20c and 20d by bulkheads 23. The bulkheads 23 are brazed or otherwise secured to an outer cylindrical member 21 and the inner surface of the air chamber 2 so as to seal the four subchambers 20a through 20d. The subchambers 20a to 20d have different volumes as will hereinafter be described.

As discussed earlier, there are provided, in this embodiment, five different spring constants K from 2.5 to 9.3 (2.5, 3.7, 5.6, 7.6 and 9.3). The spring constant K depends on the volume of the subchambers 20a to 20d. A pressure $P_o$ in the air spring 1 is represented as follows:

$$P_o = W/A \tag{1}$$

where W is weight (kg) applied on a vehicle wheel, and A is the area (cm$^2$) of the air spring 1 to which pressure is applied.

The pressure $P_o$ thus obtained is constant regardless of the spring constants when the air spring is not vibrated. The relationship between the volume V (m$^3$) of the subchambers and the spring constant are represented as follows:

$$x \times K/P_o \times A = (V/V - A \times x)^{1.4} - 1 \tag{2}$$

where x is the amount of extension of the shock absorber from its neutral position.

When the air spring has the greatest spring constant or K is 9.3, the required volume is equal to the volume of the air spring alone. When the air spring has the second greatest spring constant or K is 7.6 the required volume is the volume of the air spring 1 plus the volume of the subchamber 20a of the air chamber 2. The volume of the subchamber 20a is obtained by subtracting the volume of the air spring from the volume required when K is 7.6. By the same token, the volume of each subchamber, 20a to 20d, may be calculated based on a desire the spring constant K.

The motor 4 is a stepper motor and is operable to receive a drive signal from ECU 6 and drive an inner cylindrical member 22. The motor 4 is mounted within the subchamber 20d of the air chamber 2 and secured by a bolt 25 to a housing which in turn, forms the subchamber 20d. A sealing member is disposed to seal a portion where the motor 4 is secured to the housing.

The rotary valve 3 is composed of the outer and inner cylindrical members 21 and 22. The inner cylindrical member 22 are inserted for rotation within the outer cylindrical member in a sealing relationship. Neither a sealing member nor an O-ring is disposed between the outer cylindrical member 21 and the inner cylindrical member 22. Such members may, otherwise, resist rotation of the inner cylindrical member 21 within the outer cylindrical member 21. The inner cylindrical member 22 is hollow and has one end coupled to the motor 4 and driven for rotation by the drive shaft of the motor 4. The other end of the inner cylindrical member 22 is connected to the hose 8 through a flange 24. The inner cylindrical member 22 includes four air holes 22a, 22b, 22c and 22d corresponding to the four subchambers 20a to 20d of the air chamber 2. The air holes 22a to 22d are arranged in a straight line. The air holes 22a and 22b are different in shape from the other air holes 22c and 22d.

Such a difference in shape of the air holes results in an improvement in the response when communication between the air spring 1 and the subchambers 20a to 20d is selectively established and interrupted. In the illustrated embodiment, the inner cylindrical member 22 is rotated to selectively establish and interrupt communication between the four subchambers 20a to 20d and the air spring 1. The response can thus be improved by decreasing the angle of rotation of the motor required to selectively establish and interrupt communication between the subchambers and the air spring. Specifically, communication between the subchambers and the air spring can be selectively established and interrupted faster when the motor 4 is rotated by 25° than when the motor 4 is rotated 50°.

In order to decrease the necessary angle of rotation of the motor 4, it is effective to reduce the width of the air holes 22a to 22d in the direction of rotation of the inner cylindrical member. Desirably, the air holes 22a to 22d have a sufficient length in the axial direction of the inner cylindrical member so as to permit a sufficient amount of air to flow therethrough. The air holes 22c and 22d have the same shape as such. On the other hand, the air holes 22a and 22b cannot have a sufficient length in the axial direction since the corresponding subchambers 20a and 20b are narrow. To this end, the air holes 22a and 22b have a width slightly greater than that of the air holes 22c and 22d so as to allow a sufficient amount of air to flow therethrough.

The outer cylindrical member 21 includes four openings 21a to 21d corresponding to the air holes 22a to 22d of the inner cylindrical member 22.

The positional relationship between the air holes 22a to 22d of the inner cylindrical member 22 and the openings 21a to 21d of the outer cylindrical member 21 will be described hereinbelow with reference to FIG. 3 to 6.

Figure 2:
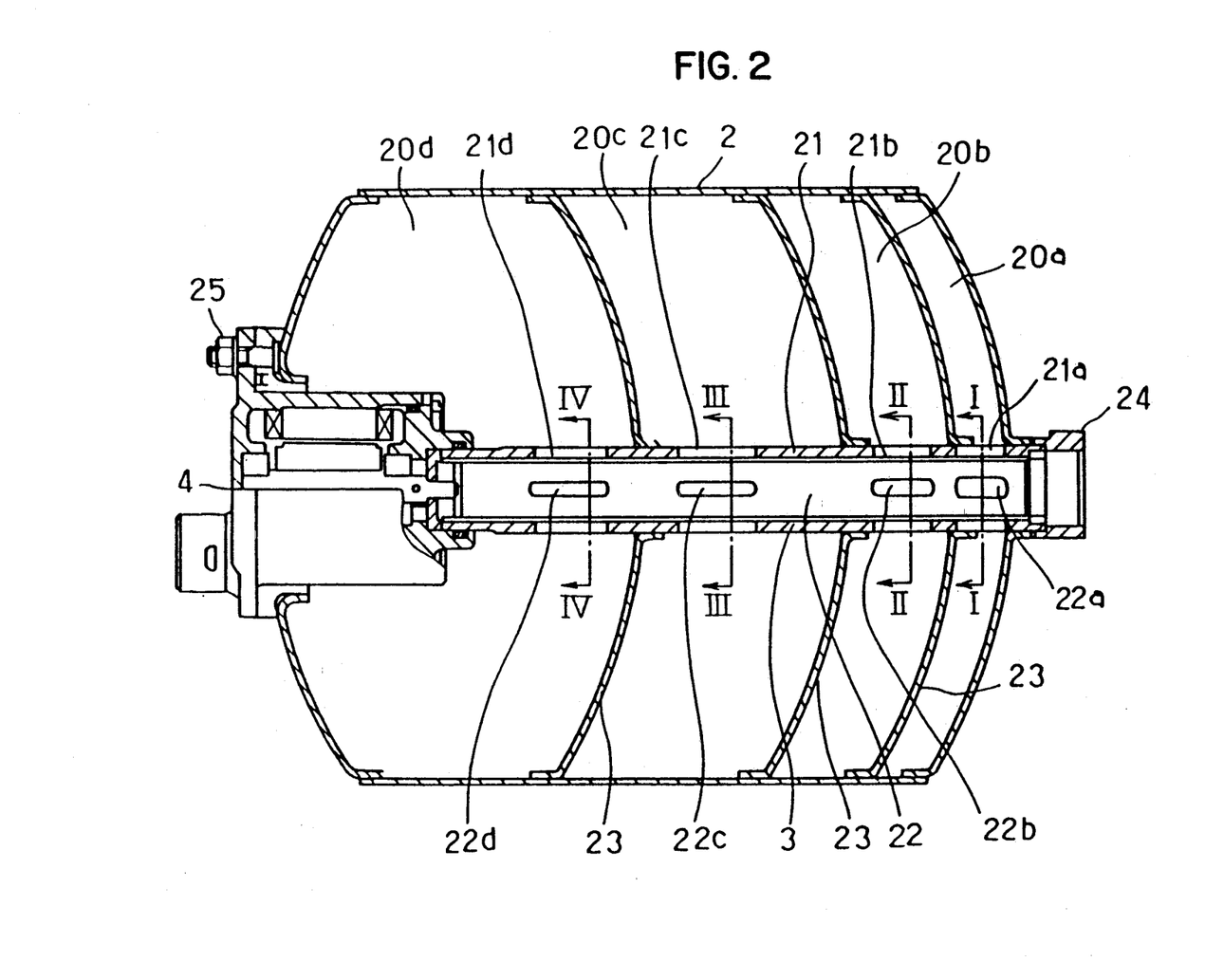
FIG. 2 is a sectional view of an air chamber shown in FIG. 1.
Figure 3:
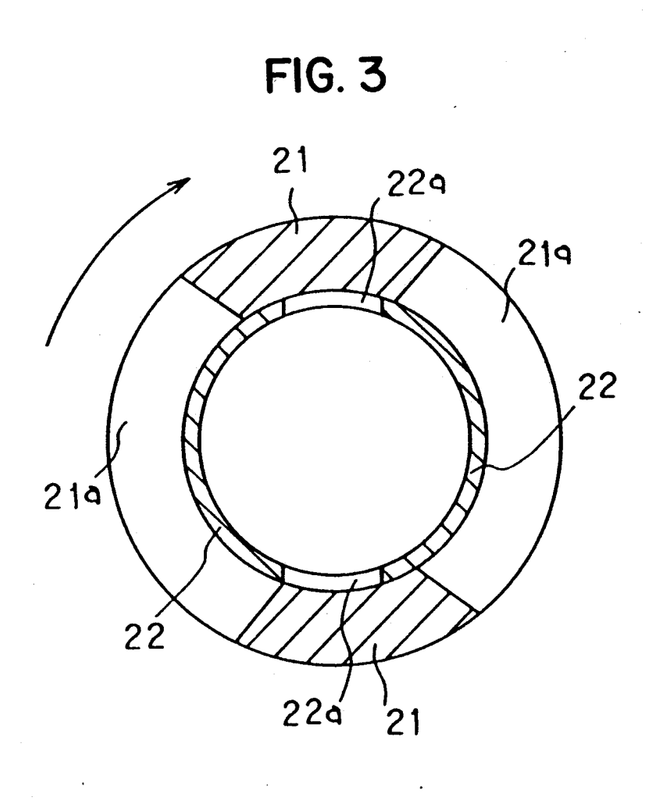
FIG. 3 is a sectional view of inner and outer cylindrical members taken along the line I—I of FIG. 2.
Figure 4:
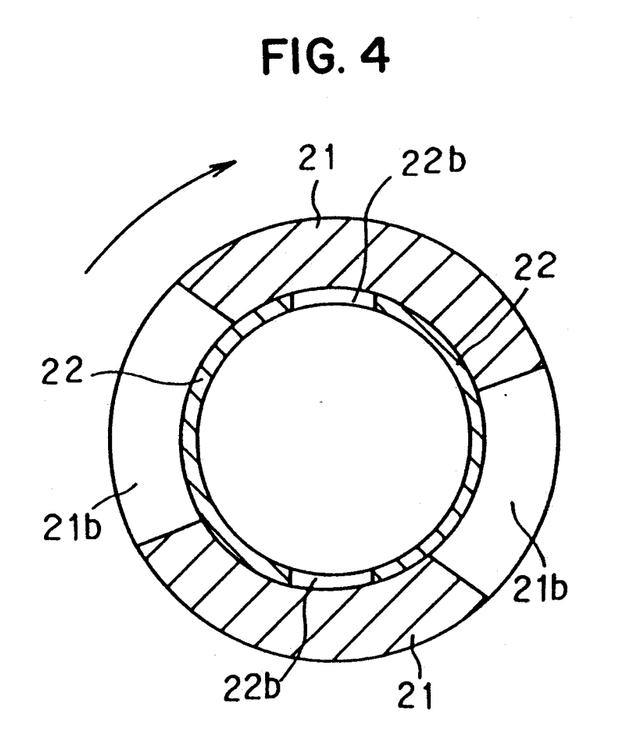
FIG. 4 is a sectional view of the inner and outer cylindrical members taken along the line II—II of FIG. 2.
Figure 5:
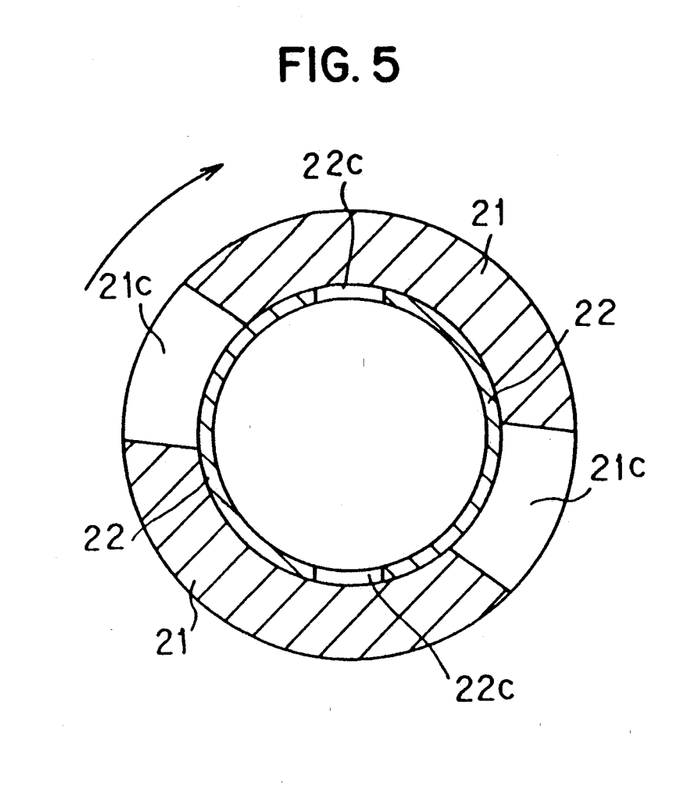
FIG. 5 is a sectional view of the inner and outer cylindrical members taken along the line III—III of FIG. 2.
Figure 6:
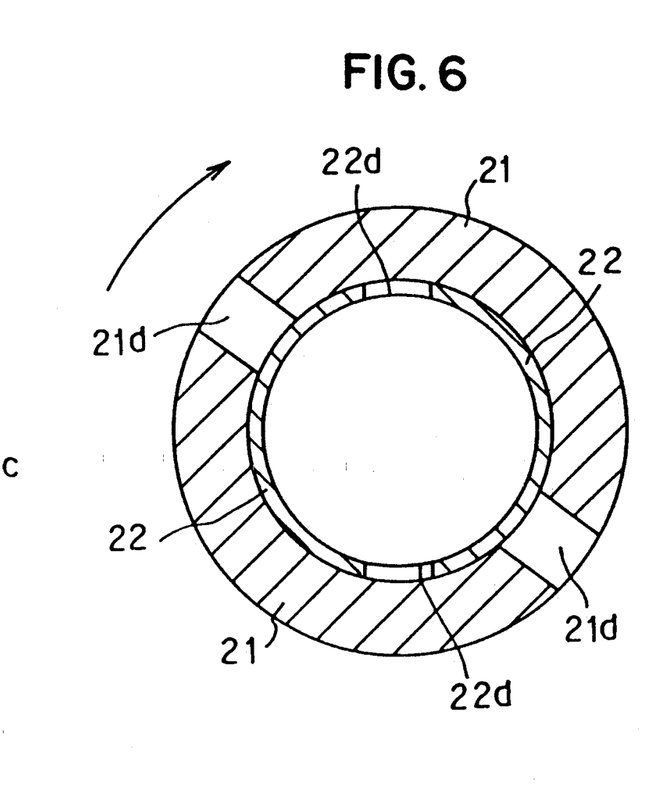
FIG. 6 is a sectional view of the inner and outer cylinderical members taken along the line IV—IV of FIG. 2.

FIG. 3 is a sectional view taken along the line I—I of FIG. 2. FIG. 4 is a sectional view taken along the line II—II of FIG. 2. FIG. 5 is a sectional view taken along the line III—III of FIG. 2. FIG. 6 is a sectional view taken along the line IV—IV of FIG. 2.

FIGS. 3 to 6 show the initial position, that is, when communication between all the subchambers 20a to 20d of the air chamber 2 and the air spring 1 are interrupted. Under these circumstances, the volume of the air spring system is only that of the air spring 1, and the spring constant is its largest value. When the inner cylindrical member 22 is rotated by the motor 4 by one level (approximately 22.5°), the air hole 22a is brought into contact with the opening 21a. Since the inner cylindrical member 22 is hollow and is communicated with the interior of the air spring 1 through the flange 14 and the hose 8, the air spring 1 and the subchamber 20a are brought into communication with one another. The volume of the air spring is now the volume of the air spring 1 plus the volume of the subchamber 20a. The spring constant is the second greatest one so that the air spring becomes its second hardest value.

When the inner cylindrical member 22 is rotated in a clockwise direction by one level (approximately 22.5°), the other air holes 22b and 22d are also angularly moved in the same or clockwise direction. However, the openings 21b to 21d corresponding to the air holes 22b to 22d are shorter than the opening 21a as shown in FIGS. 4 to 6. The air holes 22b to 22d are in no way in contact with the openings 21b to 21d. Therefore, communication between the subchambers 20b to 20d and the air spring 1 are kept interrupted, and only the air hole 20a is communicated with the air spring 1.

Next, when the inner cylindrical member 22 is rotated by the motor 4 by one additional level, or a total of two levels (approximately 45°) from the initial position, the air hole 22b shown in FIG. 4 is brought into contact with the opening 21b. At this time, the air hole 22a and the opening 21a are kept in contact as is clear from FIG. 3. The subchamber 20b in addition to the subchamber 20a are brought into communication with the air spring 1. However, the air holes 22c and 22d are still out of contact with the openings 21c and 21d. The subchambers 20a and 20d are in communication with the air spring 1, but are not communicated with the subchambers 20c and 20d.

When the inner cylindrical member 22 is rotated by two levels from its initial position, the volume of the air chamber which acts as an air spring is the volume of the air spring 1 plus the volume of the subchambers 20a and 20b.

As such, the air spring 1 has the third greatest spring constant and is its third hardest value.

By the same token, when the inner cylindrical member 22 is rotated by three levels (approximately 67.5°) from its initial position, all the subchambers 20a to 20c except for the subchamber 20d are brought into communication with the air spring 1. Therefore, the air spring 1 becomes the fourth hardest value. When the inner cylindrical member 22 is rotated by four levels (approximately 90°), all the subchambers 20a to 20d are brought into communication with the air spring 1. The air spring 1 thus becomes the softest one.

Figure 7:
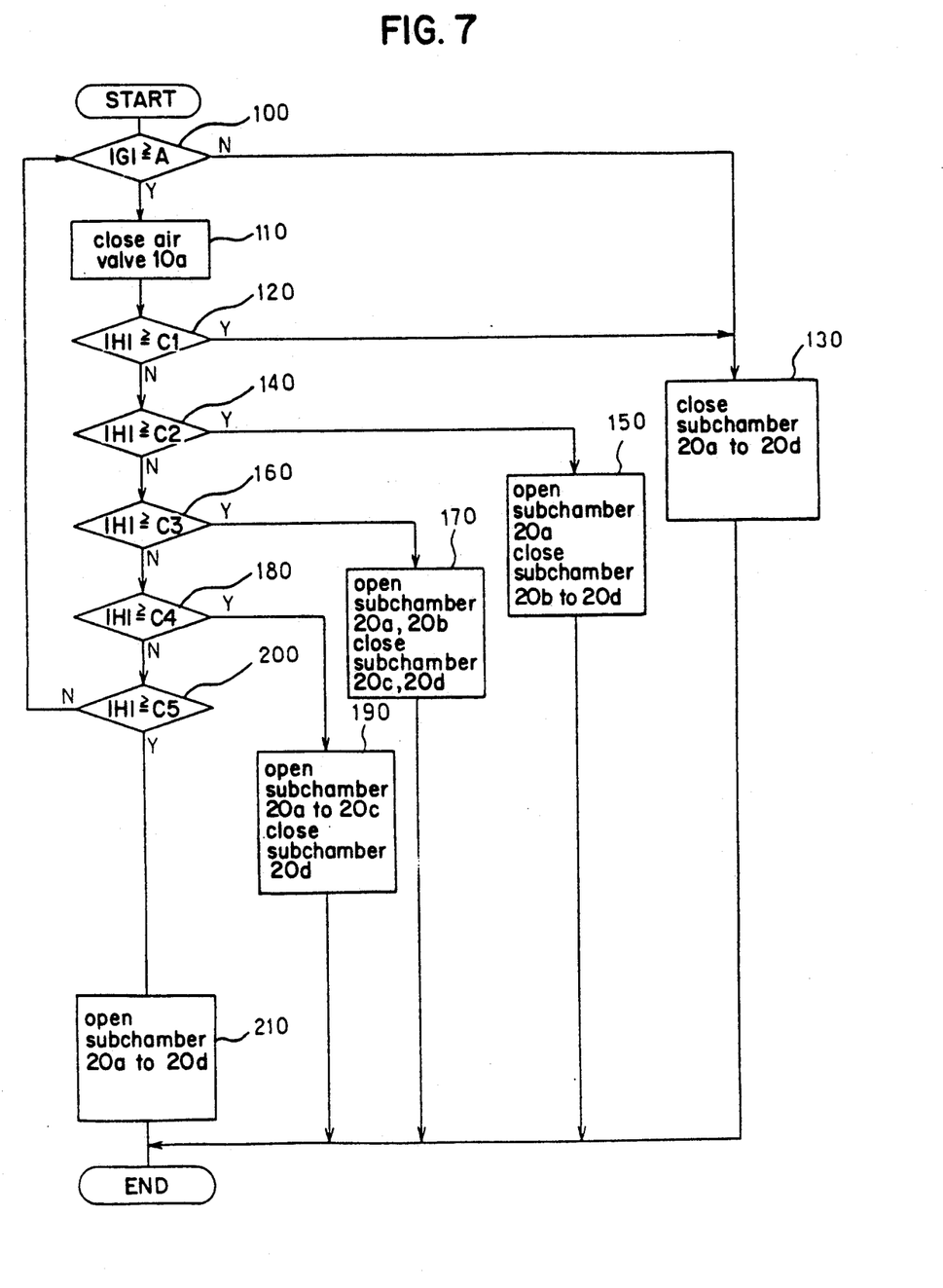
FIG. 7 is a flow chart showing the operation of an electronic control unit (ECU) shown in FIG. 1.

Operation of ECU 6 shown in FIG. 1 will now be described. FIG. 7 is a flow chart showing the operation of ECU shown in FIG. 1.

In a step 100, it is determined whether the absolute value of the vertical acceleration G of the upper portion of the air spring 1 or the vehicle body 9 as detected by the acceleration sensor 11 is greater than a given value A. The value G is a small value corresponding to acceleration which may result from a change in the ground clearance of a vehicle when a passenger rides on or gets off a vehicle. This determines whether or not the air spring 1 and the vehicle body 9 are vibrated. If the absolute value of the vertical acceleration is less than the given value A, then a step 130 is performed. In the step 130, a drive signal is sent to the motor 4 so as to interrupt communication between the air spring 1 and the subchambers 20a to 20d. As a result, the air spring becomes hardest. On the other hand, if the absolute value of the vertical acceleration G is greater than the given value A, a step 110 is performed.

In the step 110, the air valve 10a is closed to prevent air from flowing into the surge tank 10. A step 120 is next performed.

In the step 120, it is determined whether the absolute value of a change in the ground clearance H of a vehicle as detected by the level sensor 5 is greater than a given value C1. At this time, if the absolute value of the ground clearance H of a vehicle is greater than the given value C1, it is considered that large vibration is produced. Then, the step 130 is performed, and the air spring 1 becomes hardest. On the other hand, if the absolute value of the ground clearance H is less than the given value C1, a step 140 is then performed. In the step 140, it is determined whether the absolute value of the ground clearance H is greater than a given value C2 (C1>C2). If the absolute value of the ground clearance H is greater than the given value C2, a step 150 is then performed. In the step 150, the subchamber 20a is brought into communication with the air spring 1, and a drive signal is sent to the motor 4 so as to interrupt communication between the subchambers 20b to 20d and the air spring 1 or to rotate the inner cylindrical member in a clockwise direction by one level from its initial position. On the other hand, if the absolute value of the ground clearance H of a vehicle is less than the given value C2, then, a step 160 is performed.

In the step 160, it is determined whether the absolute value of the ground clearance of the vehicle is greater than a given value C3 (C2>C3). If the absolute value of the ground clearance H of the vehicle is greater than the given value C3, a step 170 is performed. In the step 170, a drive signal is sent to the motor 4 so as to establish communication between the air spring 1 and the subchambers 20a and 20b only. On the other hand, if the absolute value of the ground clearance H is less than the given value C3, a step 180 is then performed.

In the step 180, it is determined whether the absolute value of the ground clearance H of the vehicle is greater than a given value C4 (C3>C4). If the absolute value of the ground clearance H of the vehicle is greater than the given value C4, then a step 190 is performed. In the step 190, a drive signal is sent to the motor 4 so as to establish communication between the air spring 1 and the subchambers 20a to 20c only. On the other hand, if the absolute value of the ground clearance H of the vehicle is less than the given value C4, then a step 200 is performed.

In the step 200, it is determined whether the absolute value of the ground clearance H of the vehicle is greater than a given value C5 (C4>C5). If the absolute value of the ground clearance H of the vehicle is greater than the given value C5, then a step 210 is performed. In the step 210, a drive signal is sent to the motor 4 so as to establish communication between the air spring 1 and all the subchambers 20a to 20d. On the other hand, if the absolute value of the ground clearance H of the vehicle is less than the given value C5, then no steps are carried out, and the program is returned to the step 100. That is, when a change H in the ground clearance is small, vibration of the vehicle body 9 is restricted. Therefore, the spring constant of the air spring remains unchanged.

Reference is made to the given values C1 to C5 which are to be compared with the absolute value of the ground clearance H of a vehicle. The given values C1 to C5 are established as a deviation from the neutral or nominal ground clearance of the vehicle when the vehicle body 9 is not vibrated. The given value C5 is a value which is least deviated from the nominal ground clearance. The given values C5, C4, C3, C2 and C1 increase in this order. When the absolute value of the ground clearance H of a vehicle is greater than the given value C1, it is considered that the vehicle body is receiving a large amount of vibration. In such a case, the air spring 1 should be hardest so as to restrict vibration of the vehicle body 9. The magnitude of vibration of the vehicle body 9 can be found by the absolute value of the ground clearance. As the vehicle body 9 is more largely vibrated, the air spring 1 should be harder.

Operation of the suspension thus constructed is as follows.

With reference to FIG. 1, the air spring 1 is returned from its fully extended position to its neutral position, for example, when a vehicle wheel runs over a paved road from a rough road. At this time, when the air spring 1 is extended to its fullest extent, the air spring 1 is made harder until the absolute value of the ground clearance H of the vehicle becomes less than the given value C1.

when the air spring 1 is slightly contracted from its fully extended position, or when the absolute value of the ground clearance H is greater than the given value C2, but less than the given value C1, the subchamber 20a is brought into communication with the air spring 1. As a result, the air spring 1 becomes slightly softer than its hardest state (namely, the second hardest) and may more rapidly be returned to its neutral position than when it is in its hardest state.

The air spring 1 is made softer as it reaches its neutral position and may more rapidly be returned thereto.

When the air spring 1 passes through its neutral position, the air spring 1 becomes hardened. The air spring 1 may hardly be away from its neutral position and tends to be kept in its neutral position.

By restricting vibration of the air spring 1 and holding the air spring 1 in its neutral position, the hardness of the air spring 1 can most suitably be established so that the absolute value of the vertical acceleration G as detected by the acceleration sensor 11 may be less than the given value A.

A second embodiment of the present invention will now be described with reference to FIGS. 9 and 10. The second embodiment is identical to the first embodiment except for the air chamber and air spring. Thus, reference will be made mainly to the difference between the two embodiments. Also, no reference is made to a surge tank which adjusts the ground clearance of a vehicle, but such a surge tank may be used if desired.

Figure 9:
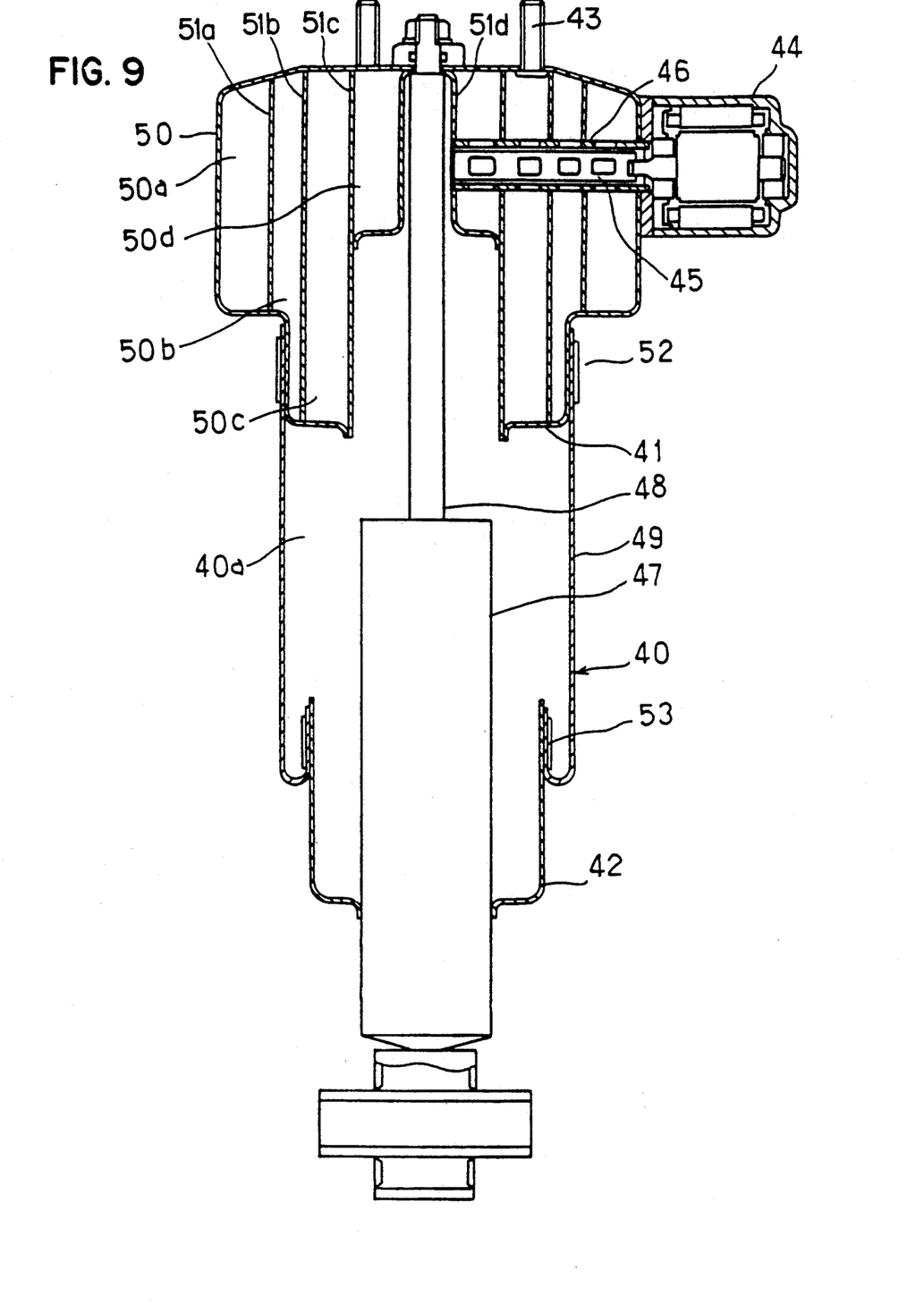
FIG. 9 is a view showing the structure of an air spring type suspension according to a second embodiment of the present invention.

In FIG. 9, an air spring 40 has an upper housing which also forms part of housings 41 and 51d of an air chamber as well as a bulkhead 51c. The upper housing is bolted to a piston rod 48 of a shock absorber. A lower housing 42 is brazed or otherwise secured to a cylinder 47 of the shock absorber. The upper housing and the lower housing 42 are coupled together by an elastically yieldable rubber element 49. The air spring 40 may thus be extendable. The rubber element 49 are fixed to the upper housing and the lower housing 42 by bands 52 and 53 so as to seal the air spring 40.

The air chamber 50 is disposed adjacent to the upper end of the air spring 40. The housings 41 and 51d are divided by bulkheads 51a to 51c so as to form four subchambers 50a to 50d.

Inner and outer cylindrical members 45 and 46 form a rotary valve and extend through the housings 41 and 51d of the air chamber 50 and the bulkheads 51a to 51c. The inner cylindrical member 45 has a hollow portion opened to an air chamber 40a of the air spring.

The inner cylindrical member 45 of the rotary valve is coupled to a drive shaft of a motor 44 which is, in turn, secured to the housing 41 of the air chamber 50. The motor 44 is operable to adjust angular position of the inner cylindrical member 45. The inside of the motor 44 is sealed by the housing, but no means is used to seal the drive shaft of the motor as in the first embodiment.

Sealingly attached to the housing 41 of the air chamber 50 is a mount 43 through which the overall system is mounted to the lower portion of a vehicle body.

Figure 10:
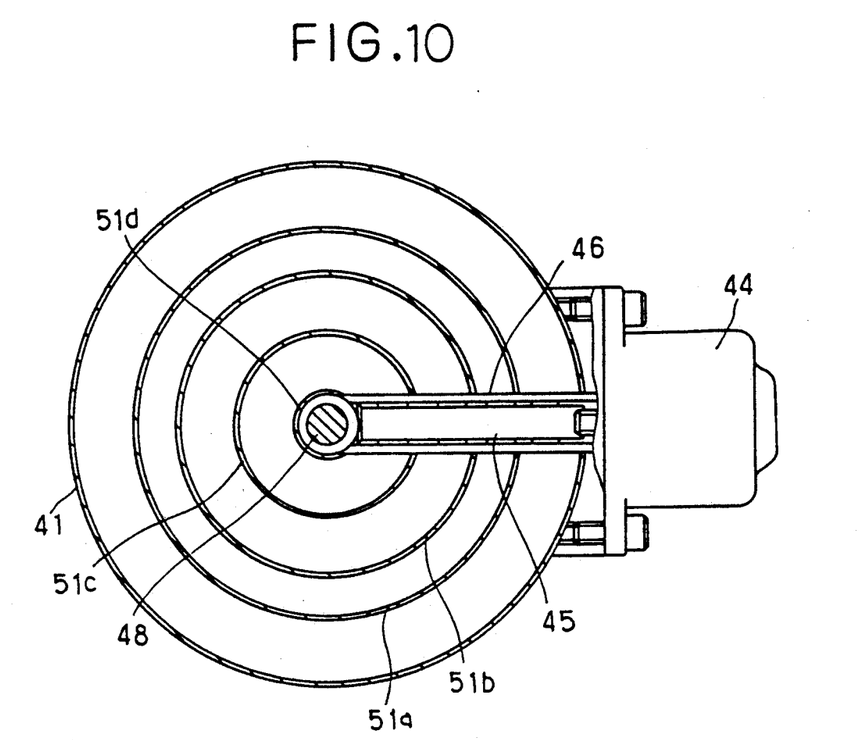
FIG. 10 is a sectional view of an air chamber shown in FIG. 10.

FIG. 10 is a sectional view of the air chamber 50 shown in FIG. 9.

As shown in FIG. 10, the subchambers 50a to 50d are annularly defined by the bulkheads 51a to 51c which are arranged concentrically about the cylinder rod 48.

In the second embodiment thus far described, the air spring 40 and the air chamber 50 are integrally formed to bring the system into a compact arrangement. Thus, the suspension may easily be mounted to a vehicle.

When the air spring 40 and the air chamber 50 are integrally formed as in the second embodiment, the volume of these components are decreased. To compensate for this, it is desirable to increase the base pressure of the air spring 40 and the air chamber 50.

Figure 11:
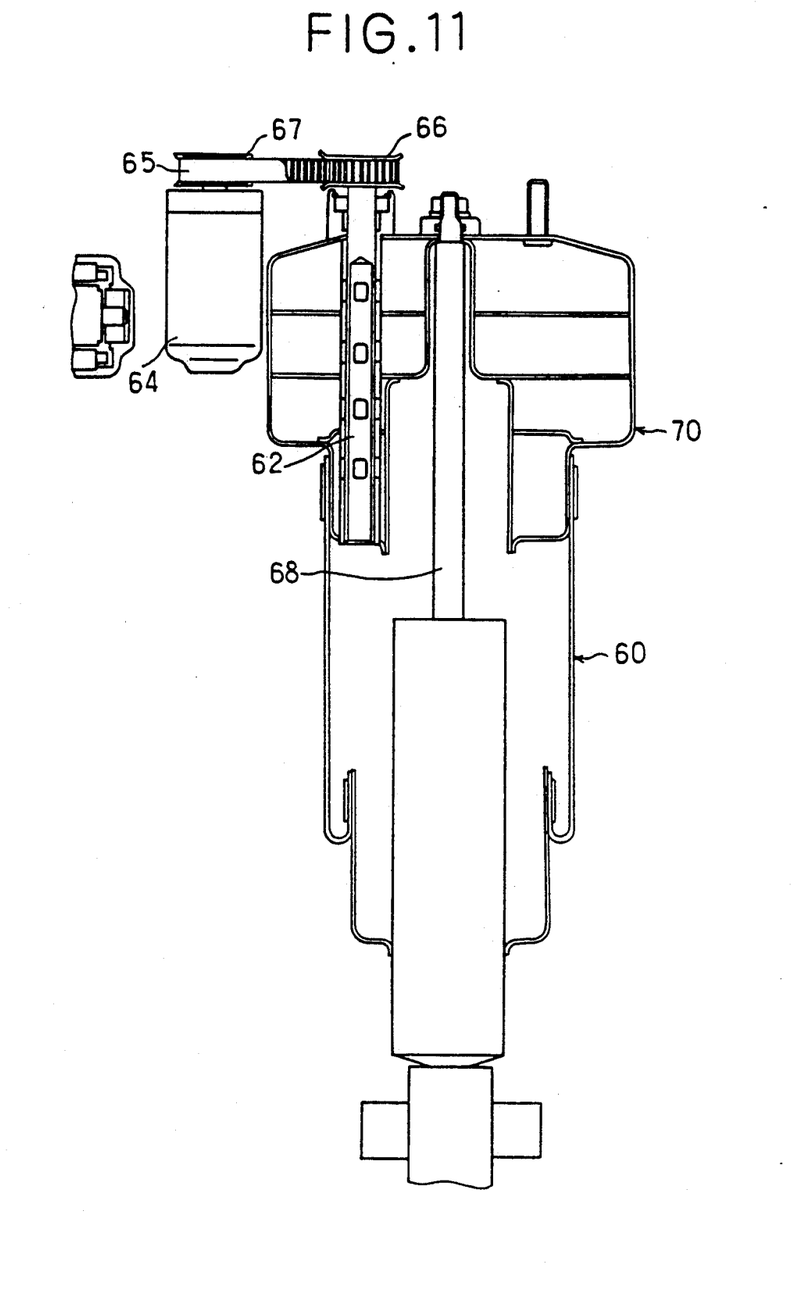
FIG. 11 is a view showing the structure of an air spring type suspension according to a third embodiment of the present invention.

A third embodiment of the present invention will next be described with reference to FIG. 11.

In the third embodiment, an air spring 60 has an upper housing which forms part of the housing of an air chamber 70. The air spring 60 and the air chamber 70 are thus integrally formed as in the second embodiment. However, the third embodiment is different from the second embodiment in the sense that the interior of the air chamber 70 is divided into four subchambers by bulkheads which extends at right angles to a cylinder head 68, that a rotary valve includes an inner cylindrical member 62 which extends through the four subchambers, and a driven pulley 66 is attached to the inner cylindrical member 62, and that a drive pulley 67 is attached to a drive shaft of a motor 64 and connected to the driven pulley 67 through a belt 65.

In the third embodiment, rotation of the motor 64 is transmitted to the inner cylindrical member 62 of the rotary valve through the belt 65. In this way, the motor 64 is more freely attached, and the suspension can more easily be mounted to a vehicle.

As discussed above, in the foregoing embodiments, a mechanism to establish and interrupt communication between the subchambers of the air chamber and the air spring is constructed by the rotary valve, or the inner and outer cylindrical members. With such a mechanism, communication between the air chamber and the air spring can be established and interrupted in response to the angular position of the inner cylindrical member with the air holes formed therein. Thus, a plurality of subchambers can be selectively communicated with the air spring with a simple structure.

In addition, the width of each subchamber in the direction of rotation of the inner cylindrical member is minimized so as to reduce the angle of rotation of the motor. This enables rapid establishment and interruption of communication between each subchamber and the air spring.

Also, in the first and second embodiments, the motor is sealed in the air chamber. This eliminates the need for a sealing member to prevent air from flowing out of the rotary shafts (the inner cylindrical member and the drive shaft of the motor). Such a sealing member may otherwise restrict rotation of the rotary shafts. With this arrangement, the air chamber can rapidly be rotated by the motor to establish and interrupt communication between the subchambers and the air spring with high response.

In the foregoing embodiments, the inner cylindrical member is rotated by the motor to provide communication between the openings of the outer cylindrical member and the air holes of the inner cylindrical member. The inner cylindrical member may alternatively be fixed, whereas the outer cylindrical member may be rotated by the motor. This alternative arrangement provides the same advantages as the foregoing embodiments.

In the second and third embodiments, the air chamber is disposed adjacent to the upper end of the air spring. Alternatively, the air chamber may be disposed adjacent to the lower end of the air spring and forms part of the lower housing.

Also, in the second embodiment, the interior of the air chamber is divided by concentrically disposed bulkheads to form a plurality of annular subchambers. However, the subchambers may take different shapes.

What is claimed is:

1. An air suspension system having plural secondary chambers, for providing a variable spring constant, comprising:
   a primary air chamber disposed between a vehicle body and a vehicle wheel, configured as an air spring;
   a plurality of secondary air chambers, selectively communicable with the primary air chamber;
   a hollow outer cylindrical member extending through the plurality of secondary air chambers and having a first surface defining a circumference of the cylinder forming the outer cylindrical member, said first surface including a plurality of openings open to said plurality of secondary air chambers and having a central axis extending parallel to an axial length thereof, and forming a center of any circular cross-sectional area thereof;
   an inner cylindrical member disposed within and coaxial with said hollow outer cylindrical member and having a second surface defining a circumference of the cylinder forming the inner cylindrical member, said second surface including a plurality of openings at locations corresponding to locations of said plurality of openings of said outer cylindrical member, said inner cylindrical member being hollow and having an interior in communication with said primary air chamber; and
   means for rotating one of said hollow inner and outer cylindrical members around said axis with respect to the other so that one of said first and second surfaces is rotated relative to the other;
   wherein at least either said plurality of openings of said inner cylindrical member or said outer cylindrical member have different lengths as measured along said circumference thereof, which is a direction of rotation by said rotating means, and a number of said secondary air chambers to communicate with the primary air chamber through said openings is adjustable by rotating said one of said hollow inner and outer cylindrical members.

2. An air spring type suspension according to claim 1, wherein said rotating means rotates said one of said hollow inner and outer cylindrical members and is kept sealed in said secondary air chambers.

3. An air spring type suspension according to the claim 2, wherein said rotating means is physically disposed within one of said plurality of secondary air chambers.

4. An air spring type suspension according to claim 1, wherein said secondary air chambers and said primary air chamber are integrally formed, and said secondary air chambers are disposed adjacent to said primary air chambers.

5. An air spring type suspension according to claim 4, wherein said secondary air chambers are disposed adjacent to an upper portion of said primary air chamber, and said primary chamber has a housing divided into a plurality of subchambers by bulkheads, said bulkheads being arranged concentrically in a direction in which said primary air chamber is extended and contracted.

6. An air spring type suspension according to claim 5, further comprising a shock absorber mounted within said primary air chamber to damp vibration of said primary air chamber, and said housing which forms part of said secondary air chamber defines an upper portion of said primary air chamber and includes a recess to allow extension and contraction of said shock absorber.

7. An air spring type suspension according to claim 1, wherein said secondary air chambers are disposed adjacent to an upper portion of said primary air chamber, and said primary chamber has a housing divided into a plurality of subchambers by bulkheads, said bulkheads being arranged substantially at right angles to the direction in which said primary air chamber is extended and contracted.

8. An air spring type suspension according to claim 7, wherein a shock absorber is mounted within said primary air chamber to damp vibration of said primary air chamber, and said housing which forms part of said secondary air chamber defines the upper portion of said primary air chamber and includes a recess to allow extension and contraction of said shock absorber.

* * * * *